(12) United States Patent
Benkley, III

(10) Patent No.: US 10,078,775 B2
(45) Date of Patent: Sep. 18, 2018

(54) DOUBLE-SIDED FINGERPRINT SENSOR

(71) Applicant: IDEX ASA, Fornebu (NO)

(72) Inventor: Fred G. Benkley, III, Andover, MA (US)

(73) Assignee: IDEX ASA, Fornebu (NO)

( * ) Notice: Subject to any disclaimer, the term of this patent is extended or adjusted under 35 U.S.C. 154(b) by 108 days.

(21) Appl. No.: 15/189,644

(22) Filed: Jun. 22, 2016

(65) Prior Publication Data
US 2016/0379035 A1   Dec. 29, 2016

Related U.S. Application Data

(60) Provisional application No. 62/183,422, filed on Jun. 23, 2015.

(51) Int. Cl.
*G01R 31/42*   (2006.01)
*G06K 9/00*    (2006.01)

(52) U.S. Cl.
CPC ......... *G06K 9/0002* (2013.01); *G06K 9/0008* (2013.01); *G06K 9/0012* (2013.01)

(58) Field of Classification Search
CPC .... G01R 31/028; G01R 31/016; G01R 31/42; G01R 31/40; G01R 31/025; G01R 31/2843; G01R 1/07; G01R 31/1227; G01R 27/2605
USPC ............... 324/519, 382, 750.17, 754.28, 548
See application file for complete search history.

(56) References Cited

U.S. PATENT DOCUMENTS

| | | | |
|---|---|---|---|
| 4,583,042 A * | 4/1986 | Riemer | G01R 1/073 324/519 |
| 5,180,901 A | 1/1993 | Hiramatsu | |
| 5,270,664 A * | 12/1993 | McMurtry | G01B 7/023 324/662 |
| 5,473,144 A | 12/1995 | Mathurin, Jr. | |
| 5,963,679 A | 10/1999 | Setlak | |
| 6,069,970 A | 5/2000 | Salatino | |

(Continued)

OTHER PUBLICATIONS

Jaechang (A Double sided fingerprint sensing method) journal vol. 11, No. 3, Mar. 2008 (pp. 323-330).*

(Continued)

*Primary Examiner* — Jermele M Hollington
*Assistant Examiner* — Taqi Nasir
(74) *Attorney, Agent, or Firm* — Rothwell, Figg, Ernst & Manbeck, P.C.

(57) ABSTRACT

A sensor has parallel upper pickup lines in an upper conductive layer, parallel lower pickup lines in a lower conductive layer, parallel drive lines oriented transversely to the upper and lower pickup lines in a middle conductive layer, a first insulating layer separating the upper pickup lines from the drive lines, and a second insulating layer opposite the first insulating layer and separating the lower pickup lines from the drive lines. Upper electrode pairs are defined at locations where an upper pickup electrode crosses a drive line, and each upper electrode pair has an impedance that is sensitive to a first object contacting or in close proximity to the upper electrode pair. Lower electrode pairs are defined at locations where a lower pickup line crosses a drive line, and each lower electrode pair has an impedance that is sensitive to a second object contacting or in close proximity to the lower electrode pair.

25 Claims, 3 Drawing Sheets

(56) References Cited

U.S. PATENT DOCUMENTS

| | | | |
|---|---|---|---|
| 6,356,097 B1* | 3/2002 | Loewenhardt | B24B 37/013 |
| | | | 257/E21.528 |
| 6,360,953 B1 | 3/2002 | Lin et al. | |
| 7,110,577 B1 | 9/2006 | Tschudi | |
| 7,251,351 B2 | 7/2007 | Mathiassen et al. | |
| 7,848,550 B2 | 12/2010 | Mathiassen et al. | |
| 7,848,798 B2 | 12/2010 | Martinsen et al. | |
| 8,195,285 B2 | 6/2012 | Martinsen et al. | |
| 8,421,890 B2 | 4/2013 | Benkley, III | |
| 8,487,624 B2 | 7/2013 | Bredholt et al. | |
| 8,791,792 B2 | 7/2014 | Benkley, III | |
| 8,866,347 B2 | 10/2014 | Benkley, III | |
| 9,122,901 B2 | 9/2015 | Slogedal et al. | |
| 9,268,988 B2 | 2/2016 | Benkley, III | |
| 2005/0068051 A1* | 3/2005 | Tesdahl | G01R 31/312 |
| | | | 324/754.28 |
| 2006/0061368 A1* | 3/2006 | Furse | G01R 31/11 |
| | | | 324/519 |
| 2012/0134549 A1* | 5/2012 | Benkley | G01N 27/04 |
| | | | 382/124 |
| 2013/0279769 A1 | 10/2013 | Benkley, III et al. | |
| 2013/0341398 A1* | 12/2013 | Rao | G06K 9/0002 |
| | | | 235/439 |
| 2014/0241595 A1 | 8/2014 | Bernstein et al. | |
| 2015/0115981 A1 | 4/2015 | Christie et al. | |
| 2015/0125050 A1* | 5/2015 | Lee | G06K 9/0002 |
| | | | 382/124 |
| 2015/0242672 A1 | 8/2015 | Benkley, III et al. | |

OTHER PUBLICATIONS

International Search Report and Written Opinion dated Nov. 7, 2016, International Application No. PCT/IB2016/053725, 14 pages.

Jaechang Shim et al., "A Double-sided Fingerprint Sensing Method," Journal of Korea Multimedia Society, vol. 11, Mar. 3, 2008 (Mar. 3, 2008), pp. 323-330.

* cited by examiner

DOUBLE-SIDED FINGERPRINT SENSOR

CROSS REFERENCE OF RELATED APPLICATION

This application claims the benefit under 35 U.S.C. § 119(e) of the filing date of provisional patent application Ser. No. 62/183,422 filed Jun. 23, 2015, the disclosure which is incorporated herein by reference.

FIELD OF THE DISCLOSURE

This disclosure relates to sensors for the electronic sensing of objects located near or about the sensor, such as epidermal ridge patterns commonly known as fingerprints.

BACKGROUND

Fingerprint sensors comprising electrodes for measuring characteristics in a finger surface are well known. For example, U.S. Pat. No. 7,110,577, U.S. Pat. No. 5,963,679, U.S. Pat. No. 6,069,970, U.S. Pat. No. 8,866,347 and Ser. No. 14/582,359 describe sensors based on different impedance or capacitance measurement principles with strip-shaped or matrix sensors comprising a number of individual sensor elements.

Fingerprint sensors are found in all kind of devices such as PC's, tablets, smart phones and smart cards for the security and ease of use it provides. The widespread use of fingerprint sensors may also provide a security problem as fingerprint sensors have been spoofed by spoof fingerprints produced from latent fingerprints. Current art fingerprint sensors typically attempt to mitigate this problem with additional security measures, such as live finger detection, at the cost of increased false rejection of fingerprints and reduced ease of use. There is, therefore, a need in the industry for an improved fingerprint sensor that is specifically architected to improve the anti-spoof protection without degrading the ease of use of the fingerprint sensor.

SUMMARY

The following presents a simplified summary in order to provide a basic understanding of some aspects described herein. This summary is not an extensive overview of the subject matter described herein. It is intended to neither identify key or critical elements of the subject matter nor delineate the scope of any later claimed subject matter. Its sole purpose is to present some concepts in a simplified form as a prelude to the more detailed description that is presented later.

Aspects of the disclosure are embodied in a sensor comprising a plurality of substantially parallel upper pickup lines in an upper conductive layer, a plurality of substantially parallel lower pickup lines in a lower conductive layer, a plurality of substantially parallel drive lines oriented transversely to the plurality of pickup lines in a middle conductive layer, a first insulating layer separating the plurality of upper pickup lines from the plurality of drive lines, a second insulating layer opposite the first insulating layer and separating the plurality of lower pickup lines from the plurality of drive lines, a plurality of upper electrode pairs, each upper electrode pair being defined at a location where an upper pickup line crosses a drive line, wherein each upper electrode pair has an impedance that is sensitive to a first object contacting or in close proximity to the upper electrode pair, and a plurality of lower electrode pairs, each lower electrode pair being defined at a location where a lower pickup line crosses a drive line, wherein each lower electrode pair has an impedance that is sensitive to a second object contacting or in close proximity to the lower electrode pair.

According to further aspects the upper pickup lines are aligned with the lower pickup lines.

According to further aspects the upper pickup lines and the lower pickup lines are oriented substantially perpendicular to the drive lines.

According to further aspects the middle conductive layer comprises upper, substantially parallel drive lines, lower, substantially parallel drive lines aligned with the upper drive lines, a third insulating layer separating the upper drive lines from the lower drive lines, and a plurality of interconnects pairwise connecting each upper drive line to a lower drive line.

According to further aspects the lower and upper drive lines are interconnected by a conductive via extending through the third insulating layer.

According to further aspects the lower and upper drive line(s) are interconnected by conductive element(s) extending beyond the third insulating layer.

According to further aspects, the insulating layer is made of glass, fiberglass, polycarbonate glass, polymer, a semiconductor material, or a layered composite material.

Aspects of the disclosure are embodied in a sensor system comprising a plurality of substantially parallel upper pickup lines in an upper conductive layer, a plurality of substantially parallel lower pickup lines in a lower conductive layer, a plurality of substantially parallel drive lines each of which is oriented transversely to the plurality of pickup lines in a middle conductive layer, a first insulating layer separating the plurality of upper pickup lines from the plurality of drive lines, a second insulating layer opposite the first insulating layer and separating the plurality of lower pickup lines from the plurality of drive lines, a plurality of upper electrode pairs, each upper electrode pair being defined at a location where an upper pickup line crosses a drive line, wherein each upper electrode pair has an impedance that is sensitive to a first object contacting or in close proximity to the upper electrode pair, a plurality of lower electrode pairs, each lower electrode pair being defined at a location where a lower pickup line crosses a drive line, wherein each lower electrode pair has an impedance that is sensitive to a second object contacting or in close proximity to the lower electrode pair. A signal source is configured to provide a signal to at least one of the drive lines, and the at least one drive line is configured to transmit the signal to the first and second objects. A detection system is configured to detect a resultant impedance on at least one of the upper electrode pairs and at least one of the lower electrode pairs, and the resultant impedances are indicative of the presence of features such as epidermal ridge patterns commonly known as fingerprints of the first and second object.

According to further aspects the upper pickup lines are substantially aligned with the lower pickup lines.

According to further aspects the first and second object are sensed simultaneously or sequentially in rapid succession.

According to further aspects the first and second object are two different fingers.

According to further aspects the upper pickup lines and the lower pickup lines are oriented substantially perpendicular to the drive lines.

According to further aspects the drive lines further comprise upper, substantially parallel drive lines, lower, substantially parallel drive lines aligned with the upper drive lines, a third insulating layer separating the upper drive lines from the lower drive lines, and a plurality of interconnects pairwise connecting each upper drive line to a lower drive line.

According to further aspects the drive lines further comprising an upper conductive layer of substantially parallel electrodes, a lower conductive layer of substantially parallel electrodes aligned with the substantially parallel electrodes of the upper conductive layer, a third insulating layer separating the upper conductive layer may be split with one common group of substantially parallel drive lines that form impedance sensitive junctions with both the upper and lower electrodes.

According to further aspects the lower and upper drive lines are interconnected by a conductive via extending through the third insulating layer.

According to further aspects the lower and upper drive lines are interconnected by a conductive element extending beyond the third insulating layer.

According to further aspects, the third insulating layer is made of glass, fiberglass, polycarbonate glass, polymer, a semiconductor material or a layered composite material.

Other features and characteristics of the subject matter of this disclosure, as well as the methods of operation, functions of related elements of structure and the combination of parts, and economies of manufacture, will become more apparent upon consideration of the following description with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
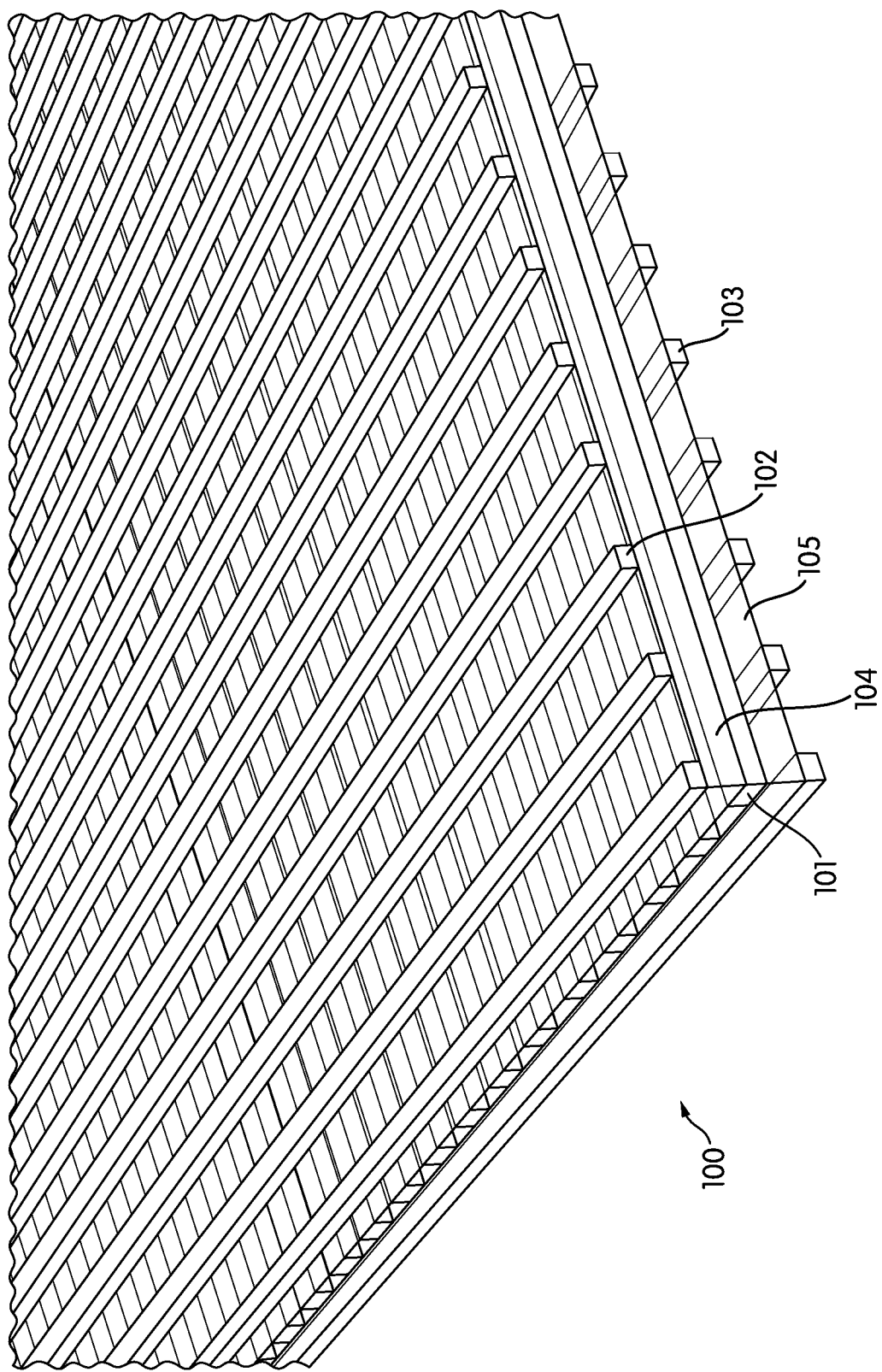
FIG. 1 illustrates a top perspective view of a sensor according to an embodiment.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

The present disclosure relates to an electronic sensor for detecting proximally located objects. In an embodiment, the sensor is a fingerprint sensor that detects surface features (e.g., ridges and valleys) of two fingers placed on the electronic sensor. In an embodiment, the electronic sensor operates based on interaction between a pair of electrodes that include a drive element and a pickup element. The pickup element may be capacitively coupled to the drive element and may sense a signal that passes from the drive element to the pickup element. Features of a proximally located object can be detected based on whether the sensor detects a change in a signal being received at the pickup element.

In an embodiment, the electronic sensor includes a top, or upper, conductive grid and a bottom, or lower, conductive grid configured to detect surface features of two proximally located objects at a plurality of locations on two sides of the sensor. The top and bottom grids each include a plurality of parallel drive lines, which are each connectable to a drive source, and a plurality of parallel pickup lines that are oriented transversely (e.g., perpendicularly) to the drive lines. The drive lines are separated from the pickup lines by an insulating (e.g., dielectric) layer. Each drive line may thus be capacitively coupled to a pickup line. In the embodiment, the drive lines can form one axis (e.g., X-axis) of the grid, while the pickup lines form another axis (e.g., Y-axis) of the grid. Each location where a drive line and a pickup line cross may form an impedance-sensitive electrode pair. This impedance-sensitive electrode pair may be treated as a pixel (e.g., an X-Y coordinate) at which a surface feature of the proximally located object is detected. The top and bottom grids form a plurality of pixels that can collectively be scanned to create a map of the surface features of the proximally located object. For instance, the pixels of the grid can differentiate locations where there is a ridge of a fingertip touching the electronic sensor and locations where there is a valley of the fingerprint. The map can be used as a pattern to match with ridge/valley patterns stored in a database. The grid sensor may create maps of two different fingers at the same time, typically a thumb and an index finger pinching the grid sensor. This makes it very difficult to find, develop, and align individual latent prints at the correct angles in order to spoof the sensor. The biomechanical angle of index print to thumb print may also be used as a secondary biometric. A prior art version of a fingerprint sensor with overlapping drive lines and pickup lines is discussed in more detail in U.S. Pat. No. 8,421,890, entitled "Electronic imager using an impedance sensor grid array and method of making" and U.S. application Ser. No. 14/582,359, entitled "Fingerprint sensor employing an integrated noise rejection structure," the respective contents of which are incorporated by reference in their entireties.

FIG. 1 illustrates a portion of an exemplary sensor structure 100. The sensor 100 includes a middle conductive layer comprising a plurality of drive elements 101, an upper conductive layer comprising a plurality of upper pickup elements 102, and a lower conductive layer comprising a plurality of lower pickup elements 103. In one embodiment, the drive elements 101 may be formed or etched as elongated, flat strips (i.e., width greater than thickness) of conductive material (e.g., copper, aluminum, gold) that are substantially parallel to each other and which may also be referred to as drive lines or drive plates. The upper and lower pickup elements 102, 103 may be formed or etched as elongated, flat strips of conductive material (e.g., copper, aluminum, gold) that are substantially parallel to each other and which may also be referred to as pickup lines or pickup plates. In an embodiment, the upper pickup elements 102 may be aligned with the lower pickup elements 103. A first insulating layer 104 made of a dielectric material separates the drive lines 101 and the upper pickup lines 102. The drive elements 101 and the upper pickup elements 102 are oriented transversely to each other, and in one embodiment, are substantially perpendicular to each other, thereby forming an area of overlap between the drive lines 101 and the crossing upper pickup lines 102. A second insulating layer 105 made of a dielectric material separates the drive lines 101 and the lower pickup lines 103. The drive elements 101 and the lower pickup elements 103 are oriented transversely to each other, and in one embodiment, are substantially perpendicular to each other, thereby forming an area of overlap between the drive lines 101 and the lower crossing pickup lines 103.

Each location where a drive element 101 and a pickup element 102, 103 cross forms an impedance-sensitive electrode pair—drive elements 101 and upper pickup elements 102 forming upper electrode pairs and drive elements 101 and lower pickup elements 103 forming lower electrode pairs. When no object is in contact with or in close proximity to the impedance-sensitive electrode pair, the impedance-sensitive electrode pair has a first impedance determined by the size of the parallel plate capacitor formed by the electrode pair, which is a function of the dimensions of the drive element 101 and dimensions of the pickup elements 102, 103 and the thickness and dielectric properties of the insulating layers 104, 105. In one embodiment, the widths of the drive elements 101 and the pickup elements 102, 103 are equal, and thus the area of overlap defined by the width of the drive line and the width of the pickup line has equal width and length. Other configurations are possible in which the width of the drive elements 101 and the pickup elements 102, 103 are different. For example, in one embodiment, the width of each of the drive elements 101 is greater than (e.g., twice) the width of each of the pickup elements 102, 103, or vice versa.

Figure 2:
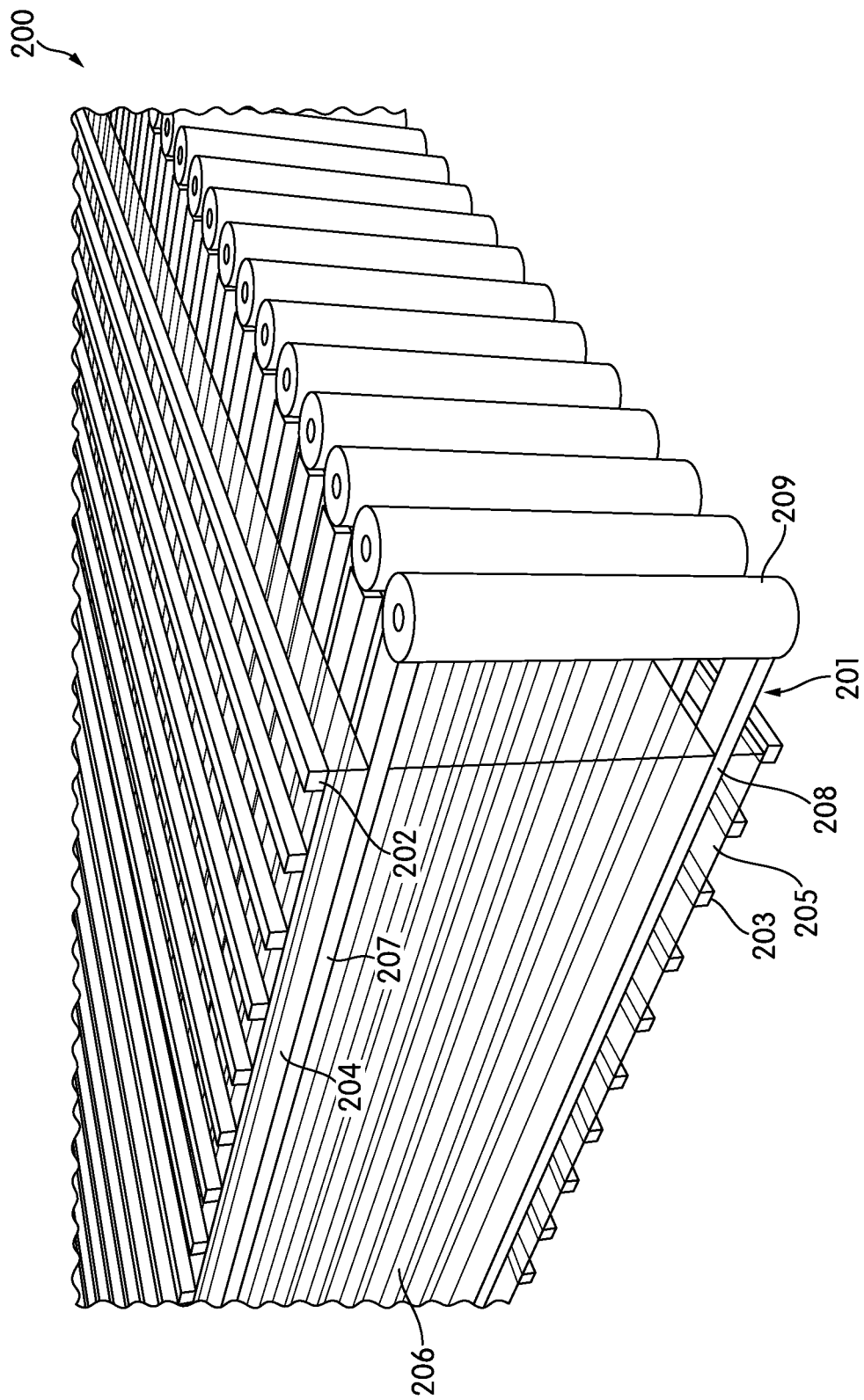
FIG. 2 illustrates a top perspective view of a sensor according to an alternate embodiment.

FIG. 2 illustrates a portion of an exemplary sensor structure 200 according to an alternate embodiment. The sensor 200 includes a first upper conductive layer comprising a plurality of upper drive elements 207, a second upper conductive layer comprising a plurality of upper pickup elements 202, a first lower conductive layer comprising a plurality of lower drive elements 208, and a second lower conductive layer comprising a plurality of lower pickup elements 203. In one embodiment, the drive elements 207, 208 may be formed or etched as elongated, flat strips of conductive material (e.g., copper, aluminum, gold) that are substantially parallel to each other and which may also be referred to as drive lines or drive plates. The pickup elements 202, 203 may be formed or etched as elongated, flat strips of conductive material (e.g., copper, aluminum, gold) that are substantially parallel to each other and which may also be referred to as pickup lines or pickup plates. A first insulating layer 204 made of a dielectric material separates the upper drive elements 207 and the upper pickup elements 202. A second insulating layer 205 made of a dielectric material separates the lower drive elements 208 and the lower pickup elements 203. The drive elements 207, 208 and the pickup elements 202, 203 are oriented transversely to each other and, in one embodiment, are substantially perpendicular to each other, thereby forming an area of overlap between the drive elements 207, 208 and the crossing pickup elements 202, 203.

In one embodiment, the sensor 200 includes a third insulating layer 206 separating the first upper conductive layer of substantially parallel electrodes 207 and the first lower conductive layer of substantially parallel electrodes 208. The upper drive elements 207 and lower drive elements 208 are pairwise connected by interconnects 209 to form drive elements 201. In one embodiment, the upper drive elements 207 and lower drive elements 208 may be interconnected by a via extending through the third insulating layer 206. In another embodiment the upper drive elements 207 and lower drive elements 208 may be interconnected by a conductive element extending beyond the third insulating layer 206. In one embodiment the third insulating layer 206 may be made of glass, fiberglass, polycarbonate glass, polymer, semiconductor material or a layered composite material.

Each location where a drive element 201, i.e., upper drive element 207 and lower drive 208, and an upper and lower pickup element 202, 203 cross forms an impedance-sensitive electrode pair—upper drive elements 207 and upper pickup elements 202 forming upper impedance-sensitive pairs, and lower drive elements 208 and lower pickup elements 203 forming lower impedance-sensitive pairs. When no object is in contact with or in close proximity to the impedance-sensitive electrode pair, the impedance-sensitive electrode pair has a first impedance determined by the size of the parallel plate capacitor formed by the electrode pair, which is a function of the dimensions of the drive elements 207, 208 and dimensions of the pickup elements 202, 203, and the thickness and dielectric properties of the insulating layers 204, 205, 206. In one embodiment, the widths of the drive elements 207, 208 and the pickup elements 202, 203 are equal, and thus the area of overlap defined by the width of the drive elements 207, 208 and the width of the pickup elements 202, 203 has equal width and length. Other configurations are possible in which the width of the drive elements 207, 208 and the pickup elements 202, 203 are different. For example, in one embodiment, the width of each of the drive elements 207, 208 is greater than (e.g., twice) the width of each of the pickup elements 202, 203 or vice versa.

Figure 3:
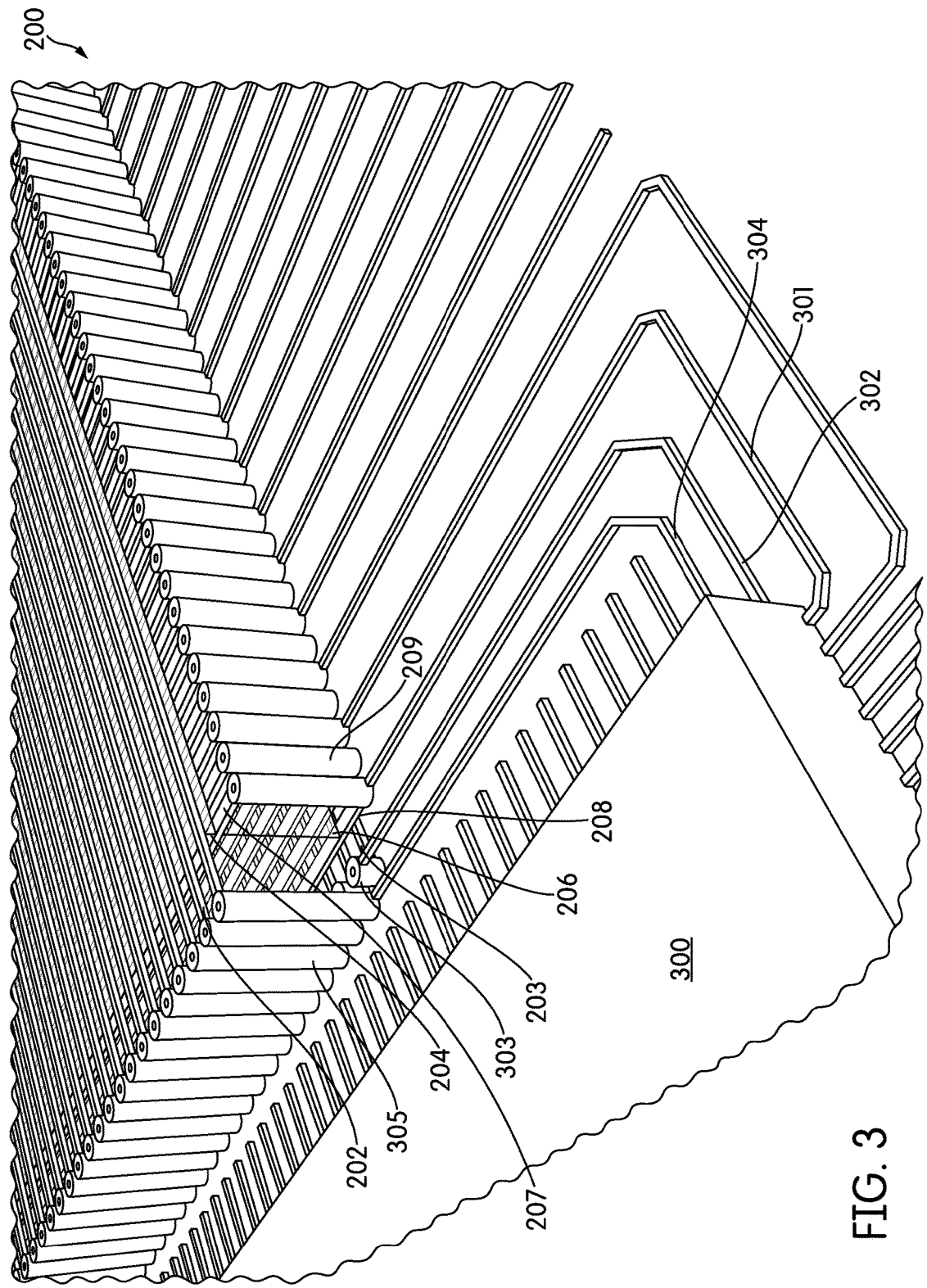
FIG. 3 illustrates a top perspective view of a sensor system according to an embodiment.

FIG. 3 illustrates a portion of a sensor system comprising a sensor 200 and an ASIC 300. Sensor 200 is comparable to the sensor 200 shown in FIG. 2. Alternatively, the sensor system as illustrated in FIG. 3 could encompass a sensor 100 as shown in FIG. 1.

Referring to FIGS. 2 and 3, the ASIC 300 includes a signal source connected to the drive elements 207, 208 by a connector 301 to provide a signal to at least one of the drive elements 207, 208. ASIC 300 further includes a detection system configured to detect a resultant impedance on at least one of the upper electrode pairs and one of the lower electrode pairs, where the resultant impedances are indicative of the presence of a ridge and valley features of a first object over the upper electrode pairs and a second object under the lower electrode pairs. In one embodiment the first object and second object are sensed simultaneously or sequentially in rapid succession. In an embodiment, the first and second objects are alternately sensed in subsections that can be reconstructed into complete images. In another embodiment, the first and second objects are one thumb and one non-thumb finger of the same hand and the angular relationship between the two is measured as a secondary user biometric.

In one embodiment the first object and second object are two different fingers, e.g., a thumb and an index finger.

In one embodiment the insulating layer 206 constitutes a part of a substrate material larger than the finger print sensing area, i.e., a substrate that encapsulates the ASIC 300 and covers connectors 301, 302 and 304 to create an integrated finger print sensor module. In the integrated sensor module, the upper pickup lines 202 are connected to the ASIC by connectors 304 and vias 305, and the lower pickup lines 203 are connected to the ASIC 300 by connectors 302 under the insulating layer 206 and vias 303 through insulating layer 205. The upper drive elements 207 and lower drive elements 208 of the drive elements 201 are interconnected by vias 209 through the insulating layer 206 and connected to the ASIC 300 by connectors 301.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in any claims. Accordingly, the scope of this disclosure is intended to include all modifications and variations encompassed within the spirit and scope of the any appended claims.

The invention claimed is:

1. A sensor, comprising:
a plurality of substantially parallel upper pickup lines;
a plurality of substantially parallel lower pickup lines;
a plurality of substantially parallel drive lines oriented transversely to, and disposed between, the pluralities of upper and lower pickup lines;
a first insulating layer separating the plurality of upper pickup lines from the plurality of drive lines;
a second insulating layer opposite the first insulating layer, and separating the plurality of lower pickup lines from the plurality of drive lines;
a plurality of upper electrode pairs, each upper electrode pair being defined at a location where an upper pickup electrode crosses a drive line, wherein each upper electrode pair has an impedance that is sensitive to a first object contacting or in close proximity to the upper electrode pair; and
a plurality of lower electrode pairs, each lower electrode pair being defined at a location where a lower pickup electrode crosses a drive line, wherein each lower electrode pair has an impedance that is sensitive to a second object contacting or in close proximity to the lower electrode pair.

2. The sensor of claim 1, wherein the upper pickup lines and the lower pickup lines are oriented substantially perpendicular to the drive lines.

3. The sensor of any one of claim 1, wherein the plurality of substantially parallel drive lines comprise:
upper, substantially parallel drive lines;
lower, substantially parallel drive lines aligned with the upper drive lines;
a third insulating layer separating the upper drive lines from the lower drive lines; and
a plurality of interconnects pairwise connecting each upper drive line to a lower drive line.

4. The sensor of claim 3, wherein the lower and upper drive lines are interconnected by conductive vias extending through the third insulating layer.

5. The sensor of claim 3, wherein the lower and upper drive lines are interconnected by conductive elements extending beyond the third insulating layer.

6. The fingerprint sensor of claim 3, wherein the third insulating layer is made of one or more materials selected from the group of materials consisting of glass, fiberglass, polycarbonate glass, polymer, a semiconductor material, and a layered composite material.

7. A fingerprint sensor system, comprising:
a plurality of substantially parallel upper pickup lines;
a plurality of substantially parallel lower pickup lines;
a plurality of substantially parallel drive lines oriented transversely to, and disposed between, the plurality of upper pickup lines and the plurality of lower pickup lines;
a first insulating layer separating the plurality of upper pickup lines from the plurality of drive lines;
a second insulating layer opposite the first insulating layer and separating the plurality of lower pickup lines from the plurality of drive lines;
a plurality of upper electrode pairs, each upper electrode pair being defined at a location where an upper pickup line crosses a drive line, wherein each upper electrode pair has an impedance that is sensitive to a first object contacting or in close proximity to the upper electrode pair;
a plurality of lower electrode pairs, each lower electrode pair being defined at a location where a lower pickup line crosses a drive line, wherein each lower electrode pair has an impedance that is sensitive to a second object contacting or in close proximity to the lower electrode pair;
a signal source configured to provide a signal to at least one of the drive lines, where the at least one drive line is configured to transmit the signal to the upper and lower electrode pairs; and
a detection system configured to detect a resultant impedance on at least one of the upper electrode pairs and at least one of the lower electrode pairs, wherein the resultant impedances are indicative of the presence of ridge and valley features of the first and second object.

8. The sensor system of claim 7, wherein the first and second objects are sensed simultaneously or in rapid succession.

9. The sensor system of claim 7, wherein the first and second objects are one thumb and one non-thumb finger of the same hand, wherein the angular relationship between the thumb and non-thumb finger is measured as a secondary user biometric.

10. The sensor system of claim 7, wherein the upper pickup lines and the lower pickup lines are oriented substantially perpendicular to the drive lines.

11. The sensor system of claim 7, wherein the drive lines further comprise:
   upper, substantially parallel drive lines;
   lower, substantially parallel drive aligned with the upper drive lines;
   a third insulating layer separating the upper drive lines from the lower drive lines; and
   a plurality of interconnects pairwise connecting each upper drive line to a lower drive line.

12. The sensor system of claim 11, wherein the lower and upper drive lines are interconnected by conductive vias extending through the third insulating layer.

13. The sensor system of claim 11, wherein the lower and upper drive lines are interconnected by conductive elements extending beyond the third insulating layer.

14. The sensor system of claim 11, wherein the third insulating layer is made of one or more materials selected from the group consisting of glass, fiberglass, polycarbonate glass, polymer, a semiconductor material, and a layered composite material.

15. A two-sided fingerprint sensor assembly, comprising:
   a first sensor side comprising upper pickup elements;
   a second sensor side in opposed relationship to the first sensor side and comprising lower pickup elements;
   drive elements disposed between the upper pickup elements and the lower pickup elements;
   a first insulating layer disposed between the drive elements and the upper pickup elements;
   a second insulating layer disposed between the drive elements and the lower pickup elements;
   a signal source configured to provide a drive signal to at least one of the drive elements that is configured to transmit the drive signal to the upper and lower pickup elements; and
   a detection system configured to sense the signal transmitted by the drive element to the upper and lower pickup elements and configured to detect features of a first fingerprint located proximately to the first sensor side based on a change in signal being received at the upper pickup elements and to detect features of a second fingerprint located proximately to the second sensor side based on changes in signal being received at the lower pickup elements.

16. The fingerprint sensor assembly of claim 15, wherein the upper pickup elements comprise a plurality of substantially parallel upper pickup lines, the lower pickup elements comprise a plurality of substantially parallel lower pickup lines, and the drive elements comprise a plurality of substantially parallel drive lines oriented transversely to the pluralities of upper and lower pickup lines.

17. The fingerprint sensor assembly of claim 16, wherein the upper pickup lines and the lower pickup lines are oriented substantially perpendicular to the drive lines.

18. The fingerprint sensor assembly of claim 15, wherein the drive elements comprise:
   a layer of upper drive elements;
   a layer of lower drive elements;
   a third insulating layer separating the upper drive elements from the lower drive elements; and
   a plurality of interconnects connecting the upper drive elements to the lower drive elements through or around the third insulating layer.

19. The fingerprint sensor assembly of claim 18, wherein the layer of upper drive elements comprises upper, substantially parallel drive lines, the layer of lower drive elements comprises lower, substantially parallel drive lines aligned with the upper drive lines, and wherein the plurality of interconnects each upper drive line pairwise to a lower drive line.

20. The fingerprint sensor assembly of claim 18, wherein the third insulating layer is made of one or more materials selected from the group of materials consisting of glass, fiberglass, polycarbonate glass, polymer, a semiconductor material, and a layered composite material.

21. The fingerprint sensor assembly of claim 15, wherein the first fingerprint and the second fingerprint are detected simultaneously or in rapid succession.

22. The fingerprint sensor assembly of claim 15, wherein the first fingerprint and the second fingerprint are one thumb print and one non-thumb fingerprint of the same hand, wherein the angular relationship between the thumb and non-thumb finger is measured as a secondary user biometric.

23. The sensor of claim 1, wherein the plurality of substantially parallel drive lines comprises a single layer of drive lines, and
   wherein each upper electrode pair is defined at a location where each upper pickup electrode crosses a respective drive line of the single layer of drive lines, and each lower electrode pair is defined at a location where each lower pickup electrode crosses a respective drive line of the single layer of drive lines.

24. The sensor system of claim 7, wherein the plurality of substantially parallel drive lines comprises a single layer of drive lines, and
   wherein each upper electrode pair is defined at a location where each upper pickup electrode crosses a respective drive line of the single layer of drive lines, and each lower electrode pair is defined at a location where each lower pickup electrode crosses a respective drive line of the single layer of drive lines.

25. The fingerprint sensor assembly of claim 15, wherein the drive elements comprise a single layer of drive elements, and the fingerprint sensor assembly further comprises:
   a plurality of upper electrode pairs, each upper electrode pair is defined at a location where each upper pickup element crosses a respective drive element of the single layer of drive elements, wherein each upper electrode pair has an impedance that is sensitive to an object contacting or in close proximity to the upper electrode pair; and
   a plurality of lower electrode pairs, each lower electrode pair is defined at a location where each lower pickup element crosses a respective drive element of the single layer of drive lines, wherein each lower electrode pair has an impedance that is sensitive to a second object contacting or in close proximity to the lower electrode pair.

* * * * *